United States Patent Office 3,462,567
Patented Aug. 19, 1969

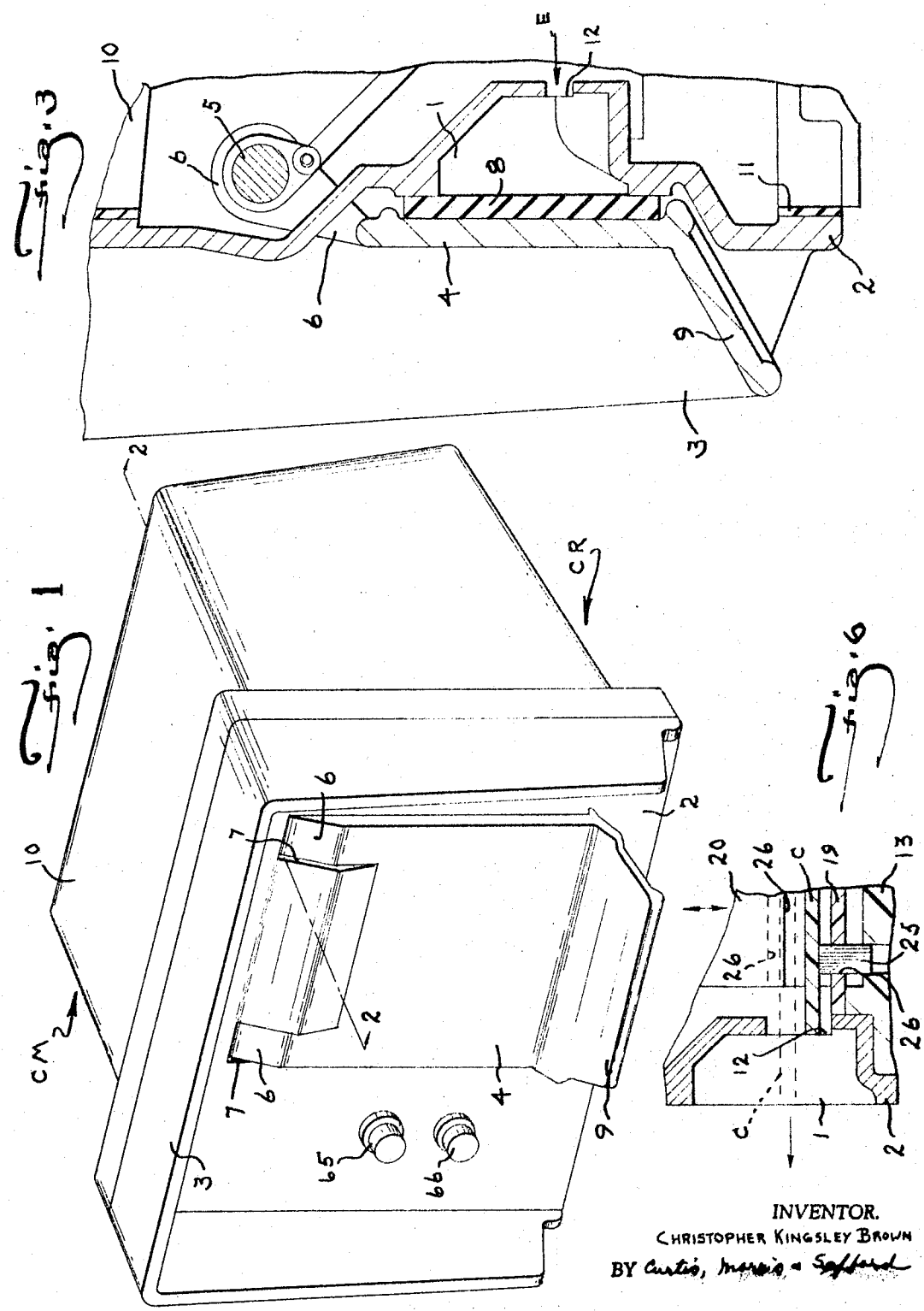

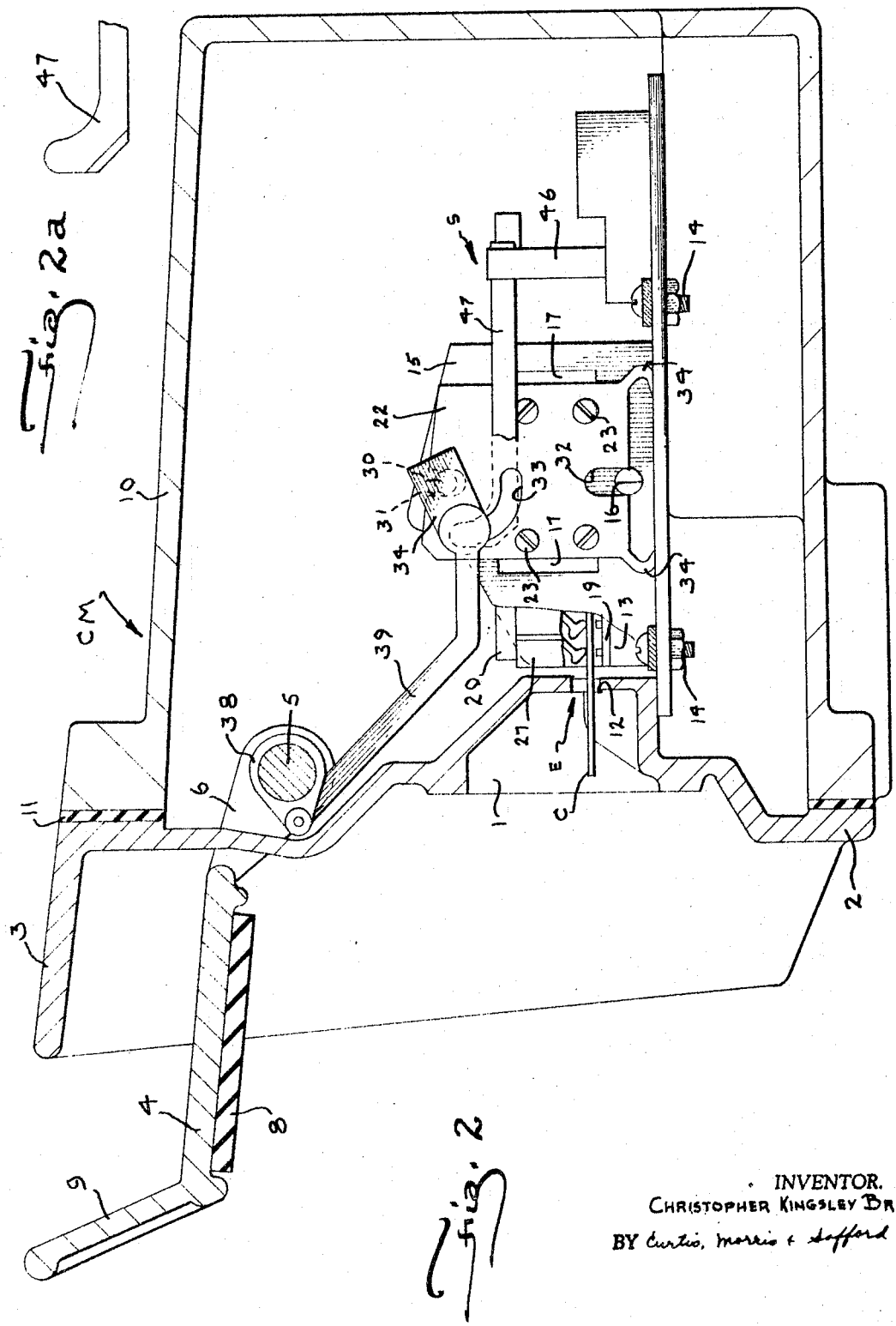

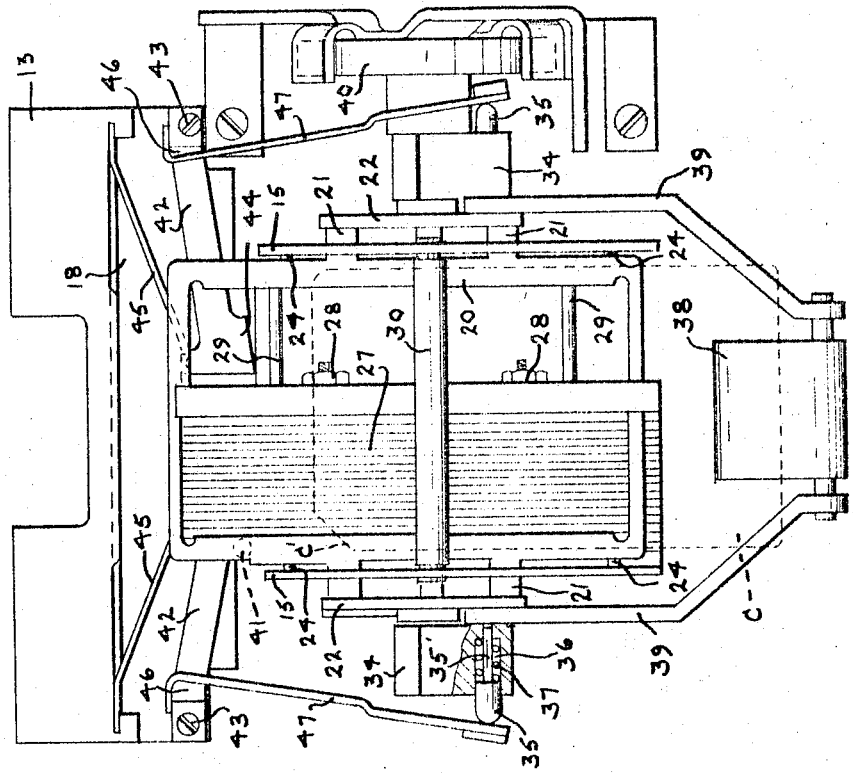
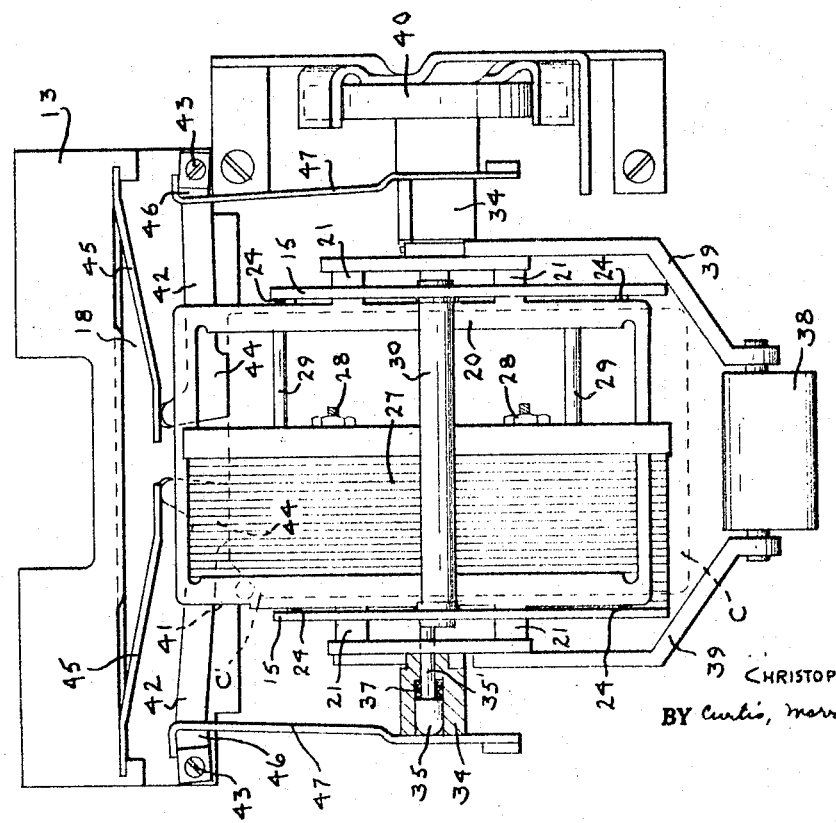

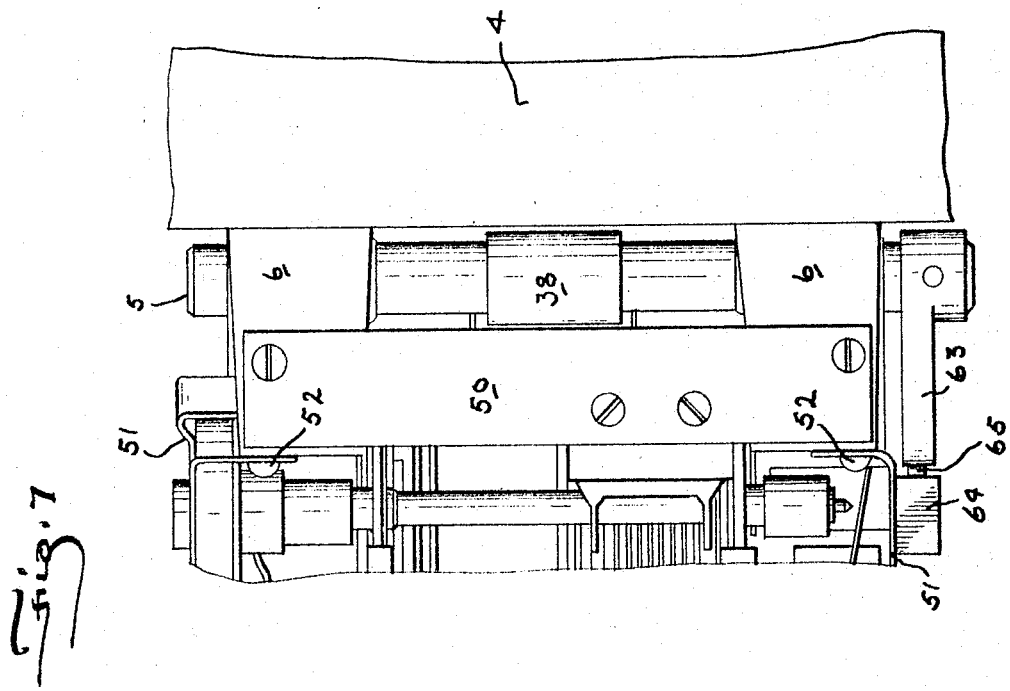
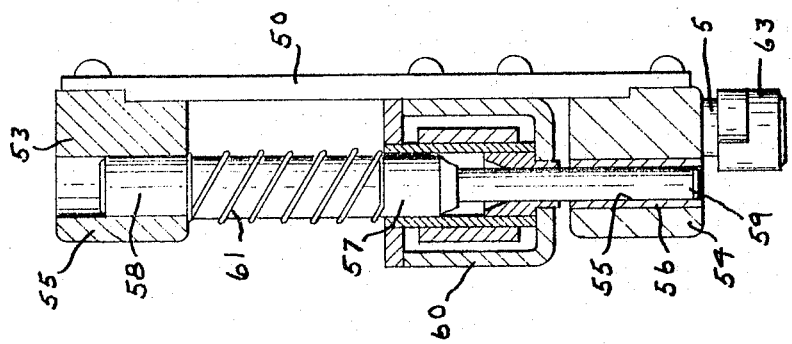

3,462,567
ALL-WEATHER CARD READER
Christopher Kingsley Brown, Camp Hill, Pa., assignor to AMP Incorporated, Harrisburg, Pa.
Filed Mar. 17, 1966, Ser. No. 535,098
Int. Cl. H01h 43/04; G06k 7/00
U.S. Cl. 200—46                    17 Claims

ABSTRACT OF THE DISCLOSURE

A card reader comprises a card-reading area provided with a movable contact means and a stationary contact means for receiving a card to be read therebetween. Operating means is provided for moving the movable contact means from a nonread position to a read position when the card is properly positioned within the card-reading area. Connecting means is provided between the operating means and the movable contact means to connect the operating means and movable contact means together. A card-engaging means is engageable by the card when it is properly positioned in the card-reading area thereby moving the connecting means into engagement between the operating means and movable contact means so that the operating means is now capable of moving the movable contact means into a reading position.

---

This invention relates to an all weather card reader and more particularly to an all weather card reader that is not subject to the ravages of the weather and is only operable when a coded card has been properly inserted within the card-reading area of the card reader.

Card readers are being used in various outdoor environments such as unmanned security gates, apartment house security, dispensing of essential material, parking lots, etc. When these card readers are disposed outdoors, they are subjected to the ravages of the weather as well as to the abuse of card holders.

An object of the invention is to provide an all weather card reader which is disposable outdoors and which is only operable when a card is placed within the card-reading area of the card reader.

A further object of the invention is to provide an all weather card reader to permit the card reader to be operated only when a card is properly placed within the card-reading area of the card reader.

Another object of the invention is the provision of an actuating system for an all weather card reader which will permit the card reader to be operated only when a card to be read has been properly positioned within the card-reading area of the card reader.

Another object of the invention is to provide an actuating system for a card reader which includes an eject means to eject a card from the card-reading area after the card has been read therein and to automatically render the card reader inoperative until another card has been placed within the card-reading area.

An additional object of the invention is the provision of an all weather card reader to prevent the operation thereof until a card to be read has been properly positioned within the card-reading area of the card reader so s to prolong the life expectancy of the contacts therein.

A still further object of the invention is to provide means in the card-reading area to assure that the card to be read is properly positioned within the card-reading area to engage actuating means to move same so that the operating means of the card reader can operate the card reader.

Still an additional object of the invention is to provide a locking system to lock the operating means after the card to be read has been properly positioned in the card-reading area and the movable contact means has been moved to a card-reading position as a result of the actuating means being connected to the operating means.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The foregoing objects are achieved in the present invention through the provision of a card reader comprising a cover member having an entrance, a card-reading area in communication with the entrance into which a card to be read is disposed and including stationary and movable contact means, door means pivotally mounted on the cover member and normally closing the entrance, operating means operatively connected between the door means and the movable contact means for moving the movable contact means toward and away from the stationary contact means when the door means is moved to a closed and open position, and actuating means for connecting the operating means to the movable contact means when a card to be read has been placed within the card-reading area and in engagement with the actuating means.

In the drawings:

FIGURE 1 is a perspective view of an all weather card reader;

FIG. 2 is a side elevational view of the card reader taken along lines 2—2 of FIGURE 1 showing a card being inserted in the card-reading area of the card reader;

FIGURE 2a is a partial view showing one end of a pawl-actuating member;

FIGURE 3 is a partial view similar to FIGURE 2 showing the cover member in a closed position;

FIGURE 4 is a plan view showing the actuating means in a normally inoperative position;

FIGURE 5 is a view similar to FIG. 4 showing the actuating means in an operative position;

FIGURE 6 is a partial sectional view showing the operation of the means to lift the card free from a forward retaining edge so that the card can be ejected from the card-reading area;

FIGURE 7 is a partial plan view of an alternative embodiment of the invention; and FIGURE 8 is a partial cross-sectional view of the locking system.

Turning now to the drawings, there is illustrated an all weather card reader CR to read the coded information on a data card. Entrance E is formed in a recessed section 1 in front section 2 of cover member CM. Front section 2 includes a three-sided hood 3 along the sides and top of section 2. A door member 4 is fixedly mounted on a shaft 5 by hinges 6 which extend through openings 7 in section 2. Door member 4 normally closes recessed section 1 and includes a gasket 8 to engage the outer edges of this recessed section to form a seal. Door member 4 also includes an extension 9 to enable an operator to move the door member to an open position. Front section 2 is secured to a back section 10 and a gasket 11 is disposed therebetween to form a seal between these sections. Shaft 5 is pivotally mounted in back section 10.

Entrance E is in communication with a recessed area 12 on the inner surface of recessed section 1. An outer end of card C is pressed against recessed area 12 when the card is in position within the card reader, and this recessed area maintains the card in position therein as illustrated in FIGURE 6.

A mounting base 13 is secured to back section 10 by bolts 14. Mounting plates 15 are secured to each side of mounting base 13 at the front ends thereof and by pins 16 about midway thereof. Part of each pin 16 extends outwardly from its corresponding mounting plate 15. Rectangular openings 17 are located in each mounting plate 15 on each side of pin 16. A channel 18 is located at the inner end of mounting base 13 and a stationary contact assembly 19 is located on the upper surface of mounting base 13 as illustrated in FIGURE 6.

Carriage 20 is movably mounted between mounting plates 15 and mounting base 13. Extensions 21 extend outwardly from each side of carriage 20 through respective openings 17 in each mounting plate 15. Each extension 21 is secured to a guide and operating member 22 by screw means 23. Projections 24 extend outwardly from each side of carriage 20 forwardly and rearwardly of extensions 21, and these projections engage mounting plates 15 in order to maintain carriage 20 in parallel alignment with mounting base 13 during the movement of carriage 20. Lug 25 extends inwardly from each front side of carriage 20, and, as illustrated in FIGURE 6, these lugs mate with slots 26 in stationary contact assembly 19 and mounting base 13. Each side of carriage 20 above lugs 25 has a stepped section 26. Contact assembly 27 is mounted on carriage 20 via bolts 28 and insulated rods 29. Contact assembly 27 is movable along with carriage 20 thereby defining a movable contact assembly.

Rod 30 is rotatably mounted in plastic bushings which are disposed in apertures in mounting plates 15. The parts of rod 30 that extend outwardly from mounting plates 15 are disposed in slots 31 in guide and operating members 22. U-shaped recesses 32 are disposed in the bottoms of members 22 in alignment with slots 31 and each of pins 16 is disposed in its respective recess 32. L-shaped openings 33 are disposed in members 22 and these are defined as cam surfaces to move carriage 20 toward and away from mounting base 13 with rod 30, slots 31, pins 16 and recesses 32 defining the guide means to assure parallel movement of carriage 20 relative to base 13 and stationary contact assembly 19. Integral spring members 34 extend outwardly from members 22 and engage mounting base 13 to return carriage 20 to its normally inoperative position.

Actuating members 34 are keyed onto the ends of rod 30 so as to be movable therewith and each actuating member has a pawl member 35 disposed therein which has a section 35' cooperable with a corresponding L-shaped opening 33. Pawl members 35 are disposed in openings 36 in actuating members 34 and they are normally biased to an inoperative position by coil springs 37 so that section 35' are not normally located in corresponding L-shaped openings 33. Upon movement of sections 35' in openings 33, members 22, carriage 20 and associated contact assembly 27 are movable in a parallel manner relative to base 13 and stationary contact assembly 19.

Shaft 5 has secured thereto an eccentric 38. Each of levers 39 has one end pivotally connected to eccentric 38 while the other end thereof is pivotally connected to actuating members 34. Thus, so long as a card has not been placed within the card-receiving or card-reading area, door member 4 will only move shaft 5, eccentric 38, levers 39, rod 30 and actuating members 34 without movement of carriage 20, contact assembly 27 and members 22; because pawl members 35 remain in their normally inoperative positions.

A torsion spring 40 is connected to one end of rod 30 in order to maintain door member 4 in its normally closed position as illustrated in FIGURES 1 and 3.

The card-receiving area is defined by recessed area 12, the inner surfaces of the sides of carrier 20, stepped sections 26 and the area between the stationary contact assembly and the movable contact assembly.

In order to assure that coded perforations in Card C are disposed in the card-receiving area so that this code can be read by the stationary and movable contact assemblies, corner C' of card C is beveled and this beveled corner engages a pin 41 in mounting base 13 of the inner portion of the card-receiving area as illustrated in FIGURES 4 and 5. If the card is not properly placed in the card-receiving area so that corner C' engages pin 41, then the card cannot be properly placed in the card-receiving area since it cannot be placed all the way therein.

The movable contact assembly and stationary contact assembly and parts associated therewith in order to read the coded perforations of a data card are disclosed in U.S. patent application Ser. No. 441,179, filed Mar. 19, 1965.

Actuating or connecting system S comprises actuating levers 42 pivotally disposed in channel 18 by means of pivot shaft 43. Actuating levers 42 include projections 44 normally disposed against the front wall of channel 18 with portions of projections 44 extending above mounting base 13 and the stationary contact assembly disposed thereon. Leaf springs 45 have one end in engagement with respective levers 42 and have the other end secured against the back surface of channel 18.

Each of levers 42 has an extension 46 extending upward therefrom in a normal direction. Pawl-actuating members 47 have one of their ends secured to respective extensions 46 while the other ends thereof are disposed opposite respective pawl members 35. Springs 45 normally maintain projections 44 of levers 42 against the front wall of channel 18, and this action maintains pawl-actuating members 47 in a normally inoperative position so as not to actuate pawl members 35.

As can be discerned from FIGURE 2a, the ends of pawl-actuating members 47 opposite pawl members 35 have a configuration similar to that of L-shaped openings 33 so that, when the pawl-actuating members are in their operative positions to bias sections 35' within respective L-shaped openings 33, sections 35' will be maintained within L-shaped openings during the movement of actuating members 34 via levers 39, eccentric 38, shaft 5 and door member 4.

The operation of the all weather card reader is as follows:

When card C is properly disposed in the card-reading area so that beveled corner C' is in alignment with pin 41, upon door member 4 being moved to its open position, the leading edge of card 1 engages projections 44 of levers 42 and pivotally rotates these levers about pivot shafts 43 against the bias of leaf springs 45 thereby causing levers 47 to be moved against pawl members 35 which move these pawl members within their openings 36 against the bias of springs 37 and sections 35' are moved into respective L-shaped openings 33.

With door member 4 in its open position as illustrated in FIGURE 2 and with card C in the card-reading area with its trailing edge in recessed area 12 which has caused actuating system S to move sections 35' within L-shaped openings 33, door member can now be moved to its closed position under the influence of spring 40 thereby rotating shaft 5, eccentric 38 and moving levers 39 which in turn rotate actuating members 34 and rod 30.

Sections 35' of pawl members 35 move along L-shaped openings 33 causing carriage 20 to be moved in a downward and parallel direction toward mounting base 13. Movable contact assembly 27 and the contacts thereof engage the top surface of card C and the contacts in alignment with the coded apertures in the card extend through these apertures and electrical contact is effected with the corresponding stationary contacts in stationary contact assembly 19 to read out the coded information of card C through appropriate circuitry (not shown) of the card reader.

After the coded information has been read out from card C, door member 4 is moved to its open position, as illustrated in FIGURE 2, and beyond this point until sections 35' of pawl members 35 engage the upper ends of openings 33. As sections 35' are moved to the upper ends of openings 28, lugs 25 engage the bottom surface of card C adjacent the forward end thereof and lift the forward edge of card C free of recessed area 12. Leaf springs 45 now come into play and pivot levers 42 about pivot shafts 43, partially ejecting card C out through entrance E, levers 42 move levers 47 in an outward direction so that springs 37 move pawl members 35 outward to move sections 35' free from openings 33. After card C has been removed, door member 4 then moves to the normally inoperative position of FIGURE 2, and the card reader is then in its inoperative condition until another card is disposed in the card-reading area to engage actuating system S to actuate the carriage actuating mechanism to read this card.

FIGURES 7 and 8 illustrate an alternative embodiment of the invention. A plate 50 is secured to the rear of shaft 5 by means of brackets 51 and screws 52. Supporting members 53 and 54 are secured to plate 50 and each has an opening 55 extending therethrough. A bushing 56 is press-fitted into opening 55 of supporting member 54. A plunger 57 has a section 58 movably disposed in opening 55 of supporting member 53 and a locking section 59 movably disposed in bushing 56. A solenoid 60 is secured to plate 50 and surrounds a portion of plunger 57 at the juncture of sections 58 and 59, and a spring 61 is disposed around section 58 and between solenoid 60 and a retaining ring 62 on section 58 to maintain plunger 57 in its normally inoperative position.

A lever 63 is secured to one end of shaft 5 and overlies the path of plunger 57 when door member 4 is in its normally closed position. A switch 64 is secured on bracket 51 and has an actuating member 65 thereon to be engaged by the end of lever 63 to actuate switch 64. Another switch (not shown) similar to switch 64 is mounted on mounting base 13 beneath an actuating member 34 and is actuated thereby when a card to be read has been properly positioned in the card-reading area. Switch 64, the other switch and signal light 65 (FIGURE 1) are connected in series.

When a card has been properly positioned in the card-reading area and door member 4 has been closed to cause the movable contact assembly to move into engagement with the card, as described hereinabove, switch 64 and the other switch are actuated by lever 63 and actuating member 34 respectively, solenoid 60 is energized to move plunger 57 against the bias of spring 61 causing locking section 59 to move into the path of lever 63 which prevents door member 4 from being opened until after a certain operation has been performed by an operator, such as, for example, pumping gas into a vehicle. Light 65 is also energized to signify that the card has been properly positioned and that the card reader is in a locked condition. This assures billing a customer for the amount of gas that has been pumped which is accomplished by conventional recording equipment (not shown) connected to the card reader. A push button 66 (FIGURE 1) is connected to the conventional equipment to unlock the card reader, i.e. to de-energize solenoid 60 after the intended operation has been terminated, so that the card can be ejected from the card-reading area as described supra.

As can be discerned, there has been disclosed a unique and novel actuating system to actuate the actuating mechanism of a card reader when a card is properly positioned within the card-reading area of the card reader.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. A card reader comprising a cover member having an entrance, a card-reading area in communication with said entrance into which a card to be read is disposed and including stationary and movable contact means, door means pivotally mounted on said cover member and normally closing said entrance, operating means operatively connected between the door means and said movable contact means for moving said movable contact means toward and away from said stationary contact means when said door means is moved to a closed and open position, and actuating means for connecting said operating means to said movable contact means when a card to be read has been placed within said card-reading area and in engagement with said actuating means.

2. A card reader according to claim 1 wherein means in said card-reading area and on said card assure proper positioning of said card in said card-reading area.

3. A card reader according to claim 1 wherein said actuating means includes means to eject said card from said card-reading area when said operating means has been moved to a card-ejecting position and to disconnect said actuating means from said operating means.

4. A card reader according to claim 1 wherein said operating means includes guide means to guide said movable contact means in a substantially parallel direction relative to said stationary contact means.

5. A card reader according to claim 1 wherein spring means connected to said operating means to maintain said door means in said closed position.

6. A card reader according to claim 1 wherein locking means provided adjacent said operating means to lock said operating means after a card has been properly positioned in said card-reading area and said actuating means has caused said operating means to move said movable contact means to a card-reading position.

7. A card reader comprising a cover member having an entrance, a card-reading area behind said entrance into which a card to be read is disposed and including stationary and movable contact means, a manually operable lever-like member mounted on said cover adjacent said entrance, operating means for moving said contact means relatively toward each other to read a card and for moving them apart to release the card, and mechanical linkage means to connect said lever-like member to said operating means, said linkage means including a part engageable by the card when it is fully inserted into said reader, said lever-like member being disconnected from said operating means when said part is not engaged by the card.

8. The reader in claim 7 wherein said part is spring loaded and helps to eject a card from the reader when said contact means are moved apart.

9. In a card reader, a card-reading area provided with stationary contact means and movable contact means for receiving a card to be read therebetween, operating means including a manually operable lever-like member provided for moving said movable contact means toward and away from said stationary contact means, said operating means being normally mechanically disconnected from said movable contact means when said card to be read is not positioned in said card-reading area, connecting means for connecting said operating means to said movable contact means upon actuation of said connection means, and card-engaging means in alignment with said card-reading area and connected to said connecting means, said card-egaging means upon being engaged by said card to be read actuating said connecting means whereby said connecting means connects said operating means to said movable contact means.

10. In a card reader according to claim 9 wherein maintaining means is provided at said card-reading area to maintain said card to be read in position between said station and movable contact means.

11. In a card reader according to claim 10 wherein said movable contact means and said operating means include means to free said card from said maintaining means.

12. In a card reader according to claim 10 wherein said card-engaging means includes means to eject said card from said card-reading area after said card has been set free from said maintaining means.

13. In a card reader according to claim 9 wherein means is located in said card-reading area and on said card to assure proper positioning of said card within said card-reading area.

14. In a card reader according to claim 9 wherein spring means are in engagement with said connecting means to maintain said connecting means in a normally inoperative position.

15. In a card read according to claim 9 wherein locking means is provided adjacent said operating means to lock said operating means in an operating position after said card has been properly position in said card-reading area and said connecting means has caused said operating means to begin moving said movable contact means into a card-reading position.

16. In a card read according to claim 9 wherein said card-engaging means includes means to eject said card form said card-reading area after said operating means has been moved to an inoperative position thereby disconnecting said connecting means from connection between said operating means and said movable contact means.

17. In a card read according to claim 9 wherein said card-engaging means includes means to move said card-engaging means to an inoperative position thereby disconnecting said connecting means from connection between said operating means and said movable contact means.

References Cited

UNITED STATES PATENTS

| | | |
|---|---|---|
| 3,042,299 | 7/1962 | Sherman. |
| 3,139,519 | 6/1964 | Reinschmidt _____ 200—46 X |
| 3,315,044 | 4/1967 | Newsome et al. _____ 200—46 |
| 3,352,981 | 11/1967 | Ekers _____ 200—46 |

ROBERT K. SCHAEFER, Primary Examiner

D. SMITH, JR., Assistant Examiner

U.S. Cl. X.R.

235—61.11